United States Patent Office 3,824,203
Patented July 16, 1974

3,824,203
POLYCHLOROPRENE FOR NON-PHASING
SOLVENT CEMENTS
Richard M. Tabibian, Wilmington, Del., assignor to E. I.
du Pont de Nemours and Company, Wilmington, Del.
No Drawing. Filed Sept. 2, 1970, Ser. No. 69,124
Int. Cl. C08c 11/72; C08d 9/14; C08f 21/04
U.S. Cl. 260—23.7 H                                    4 Claims

ABSTRACT OF THE DISCLOSURE

Chloroprene polymers, useful in non-phasing solvent cements having good tack, are produced by polymerizing chloroprene, optionally with another copolymerizable monomer, in an aqueous alkaline emulsion in the presence of water-soluble salts of:

(a) About 0.5 to 1.5 percent of a rosin acid,
(b) About 1 to 2 percent of a $C_{12}$ to $C_{20}$ unsaturated fatty acid, and
(c) About 0.5 to 1.5 percent of a condensation product of formaldehyde with a naphthalene sulfonic acid, all percentages being by weight based on the weight of chloroprene and any other copolymerizable monomer present, the percentage of (a) and (b) being based on the free acid and of (c) being based on the salt; the total percentage of (a) and (b) being at least 2, and the conversion of monomer to polymer being at least about 85 percent; and optionally having present during polymerization from 1 to 4 percent by weight of a methyl ester of a naturally occurring rosin acid based on the weight of chloroprene.

BACKGROUND OF THE INVENTION

In solvent cements containing chloroprene polymers it is common practice to include reaction products of certain basic metal oxides and heat-reactive phenol-formaldehyde resins. The resulting cements are dispersions of insoluble components in a liquid phase which consists of the solvent and the material soluble therein. These dispersions have a strong tendency, on standing, to flocculate and stratify into separate layers. This stratification, often called "phasing," is inconvenient to the user because of the need to redisperse the stratified layer prior to use of the cement.

Numerous techniques have been proposed for overcoming the problem of stratification—see, for example, the following U.S. Patents:

METHOD
3,185,658, Garrett, Addition of an organic acid.
3,308,087, Garrett, Use of a carboxyl-containing chloroprene polymer.
3,318,834, Tabibian, Addition of a polyisocyanate.
3,394,099, Garrett, Use of a high-molecular-weight resin free of low-molecular-weight components.

A recent patent, U.S. 3,427,268 to J. A. Fries, issued Feb. 11, 1969, discloses that contact cements free of phasing can be prepared using certain defined polychloroprene elastomers which contain no more than about 2% rosin or rosin-based derivatives. It is stated (col. 2, lines 42–52) that the low rosin neoprene may be prepared by solvent extraction of the polymer or by a polymerization process in which a rosin or rosin derivative is not utilized. However, the polychloroprene used in the examples was freed of rosin by an extraction step and no information is given on the direct polymerization of chloroprene in the absence of a rosin emulsifying agent.

Economically feasible manufacture of a low-rosin polychloroprene requires that it be prepared by a direct polymerization process, which does not necessitate a separate extraction of the rosin. However, the development of such a process, which will be practical for plant operation and will yield polymers from which satisfactory cements may be prepared, is not easily achieved.

Presence of a certain amount of micelle-forming surface active material is known to be essential in the emulsion polymerization of chloroprene. Unsaturated fatty acids having 12 to 20 carbon atoms are satisfactory replacements for rosin as far as the polymerization process is concerned; however, only a small amount of such acids can be tolerated in the final polymer if the adhesive films prepared from it are to have satisfactory tack. (Tack is defined as the property of an elastomer which causes two layers of the rubber which have been pressed together to adhere so firmly that attempted separation under force will occur at some point other than at the original two surfaces.) In the preparation of adhesives, tack is an important property because it ensures that the films to be adhered will stay in contact until the final adhesive bond is formed. Also tack is important during the milling and compounding steps. It is the property that enables the elastomer to form a satisfactory band on the mill so that the elastomer may be compounded by conventional methods.

SUMMARY OF THE INVENTION

Now according to the present invention it has been found that chloroprene polymers which have good tack and which can readily be formulated into solvent cements which are stable with respect to stratification can be prepared by polymerizing chloroprene, optionally with another copolymerizable monomer, in an alkaline aqueous emulsion in the presence of water-soluble salts of:

(a) About 0.5 to 1.5 percent of a rosin acid,
(b) About 1 to 2 percent of a $C_{12}$ to $C_{20}$ unsaturated fatty acid, and
(c) About 0.5 to 1.5 percent of a condensation product of formaldehyde with a naphthalenesulfonic acid, all percentages being by weight based on the weight of chloroprene and any other copolymerizable monomer present, the percentage of (a) and (b) being based on the free acid and of (c) being based on the salt; the total percentage of (a) and (b) being at least 2, and the conversion of monomer to polymer being at least about 85 percent.

It has further been found that additional advantage is achieved when the above-described process is carried out in the additional presence of 1 to 4 percent by weight of a methyl ester of a naturally occurring rosin acid, based on the weight of monomer.

DETAILED DESCRIPTION

In the processes of the present invention, except for the use of the defined emulsification system, the polymerization is carried out using conventional techniques for chloroprene polymerization.

Chloroprene alone may be polymerized, or up to 50% of the chloroprene can be replaced by a copolymerizable monomer. Representative comonomers include the following types: vinyl-substituted aromatic compounds such as styrene, vinyltoluenes and vinylnaphthalenes; acrylic and methacrylic acid derivatives such as esters and nitriles, e.g., methyl methacrylate and acrylonitrile; and conjugated diolefinic compounds such as 1,3-butadiene, isoprene, and 2,3-dichloro-1,3-butadiene.

The presence of at least 2 percent of a total of rosin acid and unsaturated fatty acid (i.e. $a+b$, above) is essential if the latex is to have sufficient colloidal stability that it can be processed by conventional techniques. Particularly troublesome is the step of stripping unreacted monomer from the latex. If insufficient $a+b$, which acts as an emulsifying agent, is present, the latex coagulates prematurely or forms an excessive amount of coagulum.

Regardless of the amount of (b) present, at least 0.5 percent of rosin acid must be present for two reasons. (1) If only the fatty acid is used (or if more than 2 percent of fatty acid is used) the resulting polymer will not have satisfactory tack, either during the milling step or during its use as an adhesive. (2) The use of only 1 to 2 percent fatty acid is not sufficient to give adequate colloidal stability to the polymer latex. It is therefore essential to supplement the fatty acid with the rosin acid. Less than about 1.5 percent of the rosin acid should be used in order that the cements prepared from the polymer should be resistant to stratification; preferably no more than about 1.2 percent should be used. Since the use of this amount of the rosin acid does not provide a latex of adequate colloidal stability, the supplemental use of at least 1 percent of fatty acid is imperative.

The use of at least 0.5 percent of the condensate of formaldehyde with a naphthalenesulfonic acid is essential in order to prevent the formation of an undesirable amount of coagulum during the polymerization step. In addition to assistance in the prevention of coagulum formation, the condensate also is beneficial in reducing the viscosity of the polymerization system and final latex. More than 1.5 percent should not be used because it creates problems during the coagulation and washing of the polymer. If too much is used, part of the polymer will be redispersed and lost during the washing step. This represents loss of product, which is uneconomical, and also increases possibilities of pollution by the presence of organic material in the wash water. A preferred range for optimum results is 0.8 to 1.2 percent.

The rosin acids that may be used include any of the rosin acids or rosin derivatives conventionally used in chloroprene polymerizations. The most important of these are wood rosin, preferably N grade or Nancy wood rosin, tall oil rosin, and disproportionated wood or tall oil rosins.

While any unsaturated fatty acid having 12 to 20 carbon atoms may be used, the preferred acids, because of their ready availability, are those having 18 carbon atoms and one or two double bonds such as oleic and linoleic acids and mixtures thereof.

The condensation products of formaldehyde and a naphthalenesulfonic acid are well-known materials. The naphthalene may be substituted with one or more lower alkyl groups. Such compounds are disclosed, for example, in U.S. Pat. 1,336,759. A discussion of compounds of this type appears in Schwartz and Perry, Surface Active Agents, 1949, p. 119.

The water-soluble salts most often used are sodium, potassium, or ammonium salts. It is often convenient to prepare the emulsion by mixing the acids with the chloroprene and dissolving the desired amount of alkaline material in the water to be used in preparing the emulsion.

It is essential that the monomer conversion should be at least about 85 percent in order to obtain a polymer that yields adhesive cements which are resistant to stratification. The preferred conversion is 88 to 95 percent.

The polymerization is conducted in conventional manner. For instance, it should be carried out in the presence of a sufficient amount of a conventional chain-transfer agent so that the final polymer is a sol type that will dissolve in solvents. Examples of conventional chain-transfer agents are alkyl mercaptans, dialkyl xanthogen disulfides and iodoform. The amount of each of these agents to use will be within the scope of those skilled in the art. The monomer emulsion may contain up to 2 percent of sulfur based on monomer.

The concentration of monomer in the monomer emulsions is not critical but usually ranges from 35 to 55 percent based on monomer plus water. The temperature of polymerization may range from 0 to 50° C., with 5 to 15° C. being the preferred range. Polymerization is initiated and maintained by addition of a suitable catalyst which generates free radicals. Examples of suitable catalysts include potassium ferricyanide and inorganic or organic peroxides or hydroperoxides such as potassium persulfate, dibenzoyl peroxide, hydrogen peroxide and cumene hydroperoxide.

Polymerization is stopped at the desired conversion in the 85%-plus conversion range by addition of conventional polymerization inhibitors, for example, as described in U.S. Pat. 2,576,009. Unreacted monomer is removed by steam distillation, for example, as described in U.S. Pat. 2,467,769. The polymer is isolated by known techniques, for example by coagulation on a freeze drum as described in U.S. Pat. 2,187,146.

It is important that the polymer be neutralized and isolated within no more than about 4 hours after the polymerization has been stopped. Otherwise, the isolated polymer suffers from the disadvantage that it is not stable against gel formation on aging—that is, during storage the polymer cross-links prematurely so that it gradually becomes unprocessable and also loses its solubility in the solvents used in the preparation of adhesives. This problem can be overcome in the following ways:

1. Neutralization and isolation within at least 4 hours after polymerization is completed.
2. Incorporation into the monomer emulsion before polymerization of 1 to 4 parts by weight per 100 parts of monomer, of the methyl ester of a naturally-occurring rosin acid.

The first of these ways is useful but somewhat impractical. The second is an additional part of the present invention and gives unexpectedly superior results.

The methyl ester of rosin is available commercially. For example, Hercules, Inc., sells it under the trademark "Abalyn." The rosin ester remains in the isolated chloroprene polymer and stabilizes it against formation of gel polymer during storage. The presence of the rosin ester eliminates the necessity for isolation of the polymer within a very short time after polymerization.

Surprisingly, the presence of the methyl ester of rosin in the isolated polymer does not adversely affect the ability of the polymer to form non-stratifying solvent cements.

At least 1 percent of the rosin ester must be used to provide significant stabilization against gel formation. More than 4 percent should not be used because it adversely affects the colloidal stability of the final latex. It is important that the methyl rosinate be present during the polymerization in order to obtain the beneficial effect on stability of the polymer.

The isolated polymer may be used in the conventional ways for the preparation of neoprene solvent cements. Typical methods are disclosed in the patents cited hereinabove under "Background of the Invention."

EXAMPLES

The invention will be better understood by reference to the following illustrative examples, wherein parts are by weight unless otherwise indicated.

Chloroprene polymers are prepared and isolated as described under each Example. Initial viscosities are measured of the freshly prepared polymer. Samples of the polymer are then put into separate polyethylene bags and are placed in an air oven maintained at 50° C. Viscosities of the aged polymers are measured after the intervals stated in the examples.

Two types of viscosity are measured:

(1) Mooney viscosities (ML1+2.5/100° C.) are measured after the polymer has been subjected to 10 passes on a rubber mill. The method used is ASTM Method 1646–61.

(2) Brookfield viscosities of a 10% solution of the unmilled polymer in toluene are measured at 25° C. at 60 r.p.m.

Adhesives are prepared by making two separate mixtures as follows:

Part A:                                            Parts by Weight
    Polychloroprene _____ 100
    MgO _____ 4
    ZnO _____ 5
Part B:
    Solvent _____ 474
    MgO _____ 4
    Phenol-formaldehyde resin _____ 45

The solvent consists of equal parts by volume of toluene, n-hexane, and acetone. The resin is "Bakelite" CKM 1634, which is a heat-reactive resin prepared by reacting 1-2 moles of formaldehyde with one mole of p-tert-butylphenol under alkaline conditions.

Adhesives containing 20 percent solids are prepared by mixing 38 parts of Part A and 285 parts of Part B. This gives an adhesive containing the following ingredients, per 100 parts of adhesive.

Solvent _____ 80
Polylchloroprene _____ 10.8
MgO _____ 1.1
ZnO _____ 0.5
Phenolic resin _____ 7.6

The adhesives are smooth and creamy in appearance. Samples are placed in bottles which are stoppered and placed in an oven maintained at 50° C. Samples are examined visually to determine whether flocculation and stratification has occurred.

Example 1

A chloroprene polymer is prepared using the following recipe:

Parts by Weight
Chloroprene _____ 100
Disproportionated rosin ("Resin 731 SA," Hercules, Inc.*) _____ 1
Oleic acid _____ 1.5
Technical dodecyl mercaptan _____ 0.18
Water _____ 108.5
Sodium hydroxide (5% aqueous solution) _____ 12.0
Sodium salt of condensate of formaldehyde and a naphthalenesulfonic acid ("Lomar" PW, Nopco Chemical Co.) _____ 1.0
Sodium sulfite _____ 0.3

*"Resin 731 SA" is disproportionated rosin that has been partially neutralized with sodium carbonate so that it has an acid number of about 140.

The above materials are emulsified and polymerization is carried out at 10° C. using as catalyst a 1% aqueous solution of potassium ferricyanide which is added at a rate sufficient to initiate and maintain polymerization. Polymerization is stopped at 88 percent conversion by adding an emulsion containing about 0.02 part each of phenothiazine and 2,5-di-tert-butylhydroquinone, and the unreacted monomer is removed by steam stripping. After the alkaline emulsion has been aged for about eight hours, the pH is adjusted to about 7 with a 10% aqueous solution of acetic acid and 5.7 parts of a stabilizer emulsion is added containing about 1.5 part of tetraethylthiuram disulfide. Acidity is adjusted to a pH of 5.6, 3 parts of 3.5% aqueous solution of hydrogen peroxide is added to improve color, and the polymer is isolated on a freeze roll.

Table I shows the results of the viscosity measurements of the freshly prepared polymer and of the polymer which has aged for two weeks at 50° C.

TABLE I

Freshly prepared polymer:
    Mooney viscosity _____ 107
    Brookfield viscosity, cps. _____ 640
Aged 2 weeks:
    Mooney viscosity, cps. _____ 118
    Brookfield viscosity, cps. _____ 900

The mill tack of the polymer and the tackiness of the adhesive film prepared from the polymer are good. After standing for three months no phasing is observed in the adhesive prepared from the polymer.

Example 2

This example illustrates the advantage of adding the methyl ester of rosin to the polymer. The polymerization of Example 1 is repeated except that different amounts (1, 2, and 4 parts) of the methyl ester of rosin ("Abalyn," Hercules, Inc.) are added in separate experiments, as shown in Table II. The monomer conversion in each sample is about 87 percent. The processing of the polymer is the same as in Example 1 except that the adjustment to a pH of 7 and addition of the tetramethylthiuram disulfide are omitted.

The results of the measurement of the Mooney and Brookfield viscosities are shown in Table II.

TABLE II

| Methyl rosinate, parts by wt | 1 | 2 | 4 | a 0 |
|---|---|---|---|---|
| Freshly prepared polymer: | | | | |
|   Mooney viscosity | 102 | 96 | 98 | 107 |
|   Brookfield viscosity, cps | 740 | 580 | 600 | 640 |
| After 2 weeks: | | | | |
|   Mooney viscosity | 107 | 97 | 97 | a 118 |
|   Brookfield viscosity, cps | 1,150 | 660 | 950 | a 900 |
| After 4 weeks: | | | | |
|   Mooney viscosity | 113 | 95 | 101 | (b) |
|   Brookfield viscosity, cps | 2,100 | 1,000 | 1,620 | | a Polymer of Example 1. The presence of the tetramethylthiuram disulfide was found to decrease somewhat the viscosities of the aged polymers as compared with polymers which contained no thiuram.
b After 4 weeks accelerated aging the polymer has been converted to gel and is no longer millable or soluble in the solvent.

All of the polymers containing the methyl rosinate have good tack on the mill and adhesives prepared therefrom yield films having good tack. The adhesives show no phasing after 5 weeks.

I claim:

1. In a process for producing chloroprene polymers useful in non-phasing solvent cements having good tack, the step comprising polymerizing chloroprene together with up to 50% of a copolymerizable monomer in an aqueous alkaline emulsion in the presence of water-soluble salts of:
    (a) About 0.5 to 1.5 percent of a rosin acid,
    (b) About 1 to 2 percent of a $C_{12}$ to $C_{20}$ unsaturated fatty acid,
    (c) About 0.5 to 1.5 percent of a condensation product of formaldehyde with a naphthalene sulfonic acid, and
    (d) About from 1 to 4 percent by weight of a methyl ester of a naturally occurring rosin acid,
all percentages being by weight based on the weight of chloroprene and any other copolymerizable monomer present; and percentages of (a) and (b) being based on the free acid and of (c) being based on the salt; the total percentage of (a) and (b) being at least 2, and the conversion of monomer to polymer being at least about 85 percent.

2. In a process for producing chloroprene polymers useful in non-phasing solvent cements having good tack, the step comprising polymerizing chloroprene at about 10° C. in the presence of water-soluble salts of:
    (a) About 1 percent of disproportionated rosin having an acid number of about 140,
    (b) About 1.5 percent of oleic acid,
    (c) About 1 percent of a condensation product of formaldehyde with a naphthalene sulfonic acid, and
    (d) About 2 percent of a methyl ester of wood rosin,
all percentages being by weight based on the weight of chloroprene; the percentages of (a) and (b) being based on the free acid and of (c) being based on the salt; and the conversion of chloroprene to polymer being about 87 percent.

3. A chloroprene polymer product produced according to a process of claim 1.

4. A chloroprene polymer product produced according to a process of claim 2.

References Cited

UNITED STATES PATENTS

| | | | |
|---|---|---|---|
| 2,630,426 | 3/1953 | Uraneck et al. | 260—27 X |
| 3,190,865 | 6/1965 | Miller | 260—29.7 X |
| 3,427,268 | 2/1969 | Fries | 260—27 X |

DONALD E. CZAJA, Primary Examiner

E. C. RZUCIDLO, Assistant Examiner

U.S. Cl. X.R.

260—23.7 A, 27 BB, 29.7 R, 92.3